US011227590B2

(12) United States Patent
Gandhi et al.

(10) Patent No.: US 11,227,590 B2
(45) Date of Patent: Jan. 18, 2022

(54) SYSTEMS AND METHODS TO SEAMLESSLY CONNECT INTERNET OF THINGS (IOT) DEVICES TO MULTIPLE INTELLIGENT VOICE ASSISTANTS

(71) Applicant: Voice of Things, Inc., Palo Alto, CA (US)

(72) Inventors: Biren Gandhi, San Jose, CA (US); Karan Sheth, Mumbai (IN)

(73) Assignee: Voice of Things, Inc., Palo Alto, CA (US)

(*) Notice: Subject to any disclaimer, the term of this patent is extended or adjusted under 35 U.S.C. 154(b) by 108 days.

(21) Appl. No.: 16/355,643

(22) Filed: Mar. 15, 2019

(65) Prior Publication Data

US 2019/0295547 A1    Sep. 26, 2019

Related U.S. Application Data

(60) Provisional application No. 62/645,646, filed on Mar. 20, 2018.

(51) Int. Cl.
*G10L 15/22* (2006.01)
*H04L 29/08* (2006.01)
*H04L 29/06* (2006.01)
*G10L 15/18* (2013.01)
(Continued)

(52) U.S. Cl.
CPC ............ *G10L 15/22* (2013.01); *G06F 40/211* (2020.01); *G10L 15/18* (2013.01); *G10L 15/30* (2013.01);
(Continued)

(58) Field of Classification Search
CPC ....... G10L 15/22; G10L 15/265; G10L 15/18; G10L 15/30; G10L 2015/223;
(Continued)

(56) References Cited

U.S. PATENT DOCUMENTS 6,760,324 B1   7/2004 Scott et al.
7,590,538 B2   9/2009 St. John
(Continued)

OTHER PUBLICATIONS

Pullstring Conversation Canvass Guide, Aug. 1, 2018 at https://help.pullstring.com/docs/conversation-canvas.
(Continued)

*Primary Examiner* — Jesse S Pullias
(74) *Attorney, Agent, or Firm* — Deepali Brahmbhatt; Devlin Law Firm LLC

(57) ABSTRACT

The systems and methods of seamlessly connecting an internet of things ("IoT") device to one or more intelligent voice assistants, comprising: configuring a manager module to manage an IoT device connected to a network; receiving a speech command for the IoT device at the manager module through a mobile application, a smart speaker, a web interface or any other user interface; connecting to a central Speak-to-IoT cloud service; receiving a map to connect to a customer specific Speak-to-IoT cloud service based on the customer, IoT device type and manager module; authenticating with the customer specific Speak-to-IoT cloud service; communicating and executing the speech command on the IoT device. The systems and methods further comprising adding or replacing one or more IoT device with another device type or manager module of another type.

16 Claims, 11 Drawing Sheets

House with Pool connected with different brand devices

(51) Int. Cl.
  *G10L 15/30* (2013.01)
  *G06F 40/211* (2020.01)
(52) U.S. Cl.
  CPC .............. *H04L 63/08* (2013.01); *H04L 67/12* (2013.01); *H04L 67/141* (2013.01); *G10L 2015/223* (2013.01); *H04L 67/10* (2013.01)
(58) Field of Classification Search
  CPC .................. G06F 3/167; G06F 40/211; H04M 2201/40; H04L 67/12; H04L 67/141; H04L 67/10; H04L 67/125; G04L 63/08; H04W 12/06
  USPC .................................. 704/231–257, 270, 275
  See application file for complete search history.

(56) References Cited

U.S. PATENT DOCUMENTS

| | | | |
|---|---|---|---|
| 9,275,642 | B2 | 3/2016 | Abdossalami et al. |
| 9,479,640 | B1 | 10/2016 | Saylor et al. |
| 2011/0029315 | A1* | 2/2011 | Nichols ................ H04M 11/027 704/275 |
| 2014/0343950 | A1* | 11/2014 | Simpson ................. G10L 15/22 704/275 |
| 2016/0087933 | A1* | 3/2016 | Johnson ............ H04W 12/0023 709/245 |
| 2016/0118048 | A1* | 4/2016 | Heide ..................... G10L 15/22 704/275 |
| 2016/0344815 | A1* | 11/2016 | Hyun .................... H04L 67/025 |
| 2017/0116986 | A1* | 4/2017 | Weng ...................... G10L 15/22 |
| 2017/0126614 | A1* | 5/2017 | Sinha ..................... H04L 67/42 |
| 2018/0133583 | A1* | 5/2018 | Tran ...................... H04W 84/18 |
| 2018/0295176 | A1* | 10/2018 | Sundaresan ............. G06F 3/167 |
| 2019/0245713 | A1* | 8/2019 | Lo ........................... H04L 41/28 |

OTHER PUBLICATIONS

Jan Konig, Make an API Call from an Alexa Skill and Google Action, Jan. 15, 2019 at https://www.jovo.tech/tutorials/api-call.

* cited by examiner

SYSTEMS AND METHODS TO SEAMLESSLY CONNECT INTERNET OF THINGS (IOT) DEVICES TO MULTIPLE INTELLIGENT VOICE ASSISTANTS

PRIORITY APPLICATIONS

For purposes of the USPTO extra-statutory requirements, the present application constitutes a utility application related to and claims the benefit of priority from U.S. Provisional Patent Application No. 62/645,646 filed on Mar. 20, 2018.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

FIELD OF THE INVENTION

The present invention is in the technical field of voice enablement for internet of things devices to accept and receive speech commands directly or through a manager module that is intelligent voice assistant for a user, a household, a business, an industrial setup, or other similar housing entities. More particularly, the present invention is in the technical field of making compatible speech commands on different internet of things devices irrespective of the brand or type of intelligent voice assistant managing the housing entity. More particularly, the present invention is in the technical field of simple, centralized and consolidated interfaces for internet of things devices.

BACKGROUND

In order to participate in the intelligent voice assistant ecosystem, today's IoT devices need to have their own Speaker and Microphone or they can leverage IoT Hub Devices' hardware, use existing smart speakers, or applications from Amazon Alexa, Google Home Assistant, Apple HomePod, Microsoft Cortana, etc. In most of the cases, device manufacturers have to deal with not only the hardcore device functionality, but the corresponding voice AI programming as well. Connecting an internet-enabled smart device with any of the voice service providers is a highly challenging, time & resource intensive, customized task; that needs to be repeated for every single voice service provider. It often requires smart device manufacturer to create and operate on some cloud-based software components, including dealing with their security implications. With most of the current approaches, it is practically impossible for device manufacturers to enable additional voice commands to unlock new features or capabilities in smart devices once they are sold to and deployed by their end-consumers. Any changes to APIs or protocols from any of the voice service providers could practically make the end user's smart device useless.

IoT Device Manufacturers, also known as Vendors or Customers of the Speak-to-IoT cloud service have a strenuous path towards voice enablement. There are three approaches, a customer can take: (1) Bundle approach, (2) Hub approach and (3) Do it Yourself Approach. The bundle approach requires self-contained hardware and software within the device including an on-board AI agent and Internet connectivity is optional. The bundle approach may not include high-quality microphone/speaker, requires higher device cost due to extra hardware, may not provide remote operations, requires dealing with many AI agents, i.e., 1 per voice service provider, and not much flexibility for software Maintenance, Upgrade or Patch.

The Hub Approach has AI Brain and internet connectivity via the hub using multi-protocol (Zigbee etc.). It may not include open hub protocol and hence results in customer lock-in, provides limited remote operations, mandates dealing with many AI agents—1 per voice service and no capability for Maintenance, Upgrade or Patch. Similarly, the Do it Yourself (DIY) approach also has drawbacks. While you can leverage off the shelf speakers, there is no AI-Brain in device. It requires dealing with multiple 1-per voice agent integrations, skillset or resources to operate cloud, cyber security vulnerability, time-to-market and no capability for maintenance, upgrade or patch.

SUMMARY OF THE INVENTION

The present invention is systems and methods of seamlessly connecting an internet of things ("IoT") device to one or more intelligent voice assistants, comprising: configuring a manager module to manage an IoT device connected to a network; receiving a speech command for the IoT device at the manager module through a mobile application, a smart speaker, a web interface or any other user interface; connecting to a central Speak-to-IoT cloud service; receiving a map to connect to a customer specific Speak-to-IoT cloud service based on the Customer, IoT device type and manager module; securely authenticating with the customer specific Speak-to-IoT cloud service; communicating and executing the speech commands on the IoT device.

The systems and methods, further comprising: receiving a specification file from a customer; generating a runtime Speak-to-IoT cloud module and an IoT device module that translate manager module voice command syntax to customer command syntax.

The systems and methods, further comprising: converting the IoT device to a voice enabled IoT device.

The systems and methods, further comprising: authenticating the manager module and the IoT device and encrypting the speech command.

The systems and methods, further comprising: adding or replacing the IoT device with another IoT device of the same device type from another customer for seamless connectivity.

The systems and methods, further comprising: adding or replacing the manager module with a manager module of another type for seamless connectivity.

The systems and methods, wherein the manager module is another IoT device of a different brand invoking a speech command based on a detected parameter for cross-brand automation.

The systems and methods, further comprising: authenticating using a speech command to provide a touchless experience; and allowing role-based access to invoke additional speech commands.

The systems and methods, further comprising: consolidating two or more speech commands for communicating and executing in a sequence using a single speech command.

The systems and methods, further comprising: using a blockchain platform for the Speak-to-IoT cloud or customer specific Speak-to-IoT cloud.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION OF THE INVENTION

Figure 1:
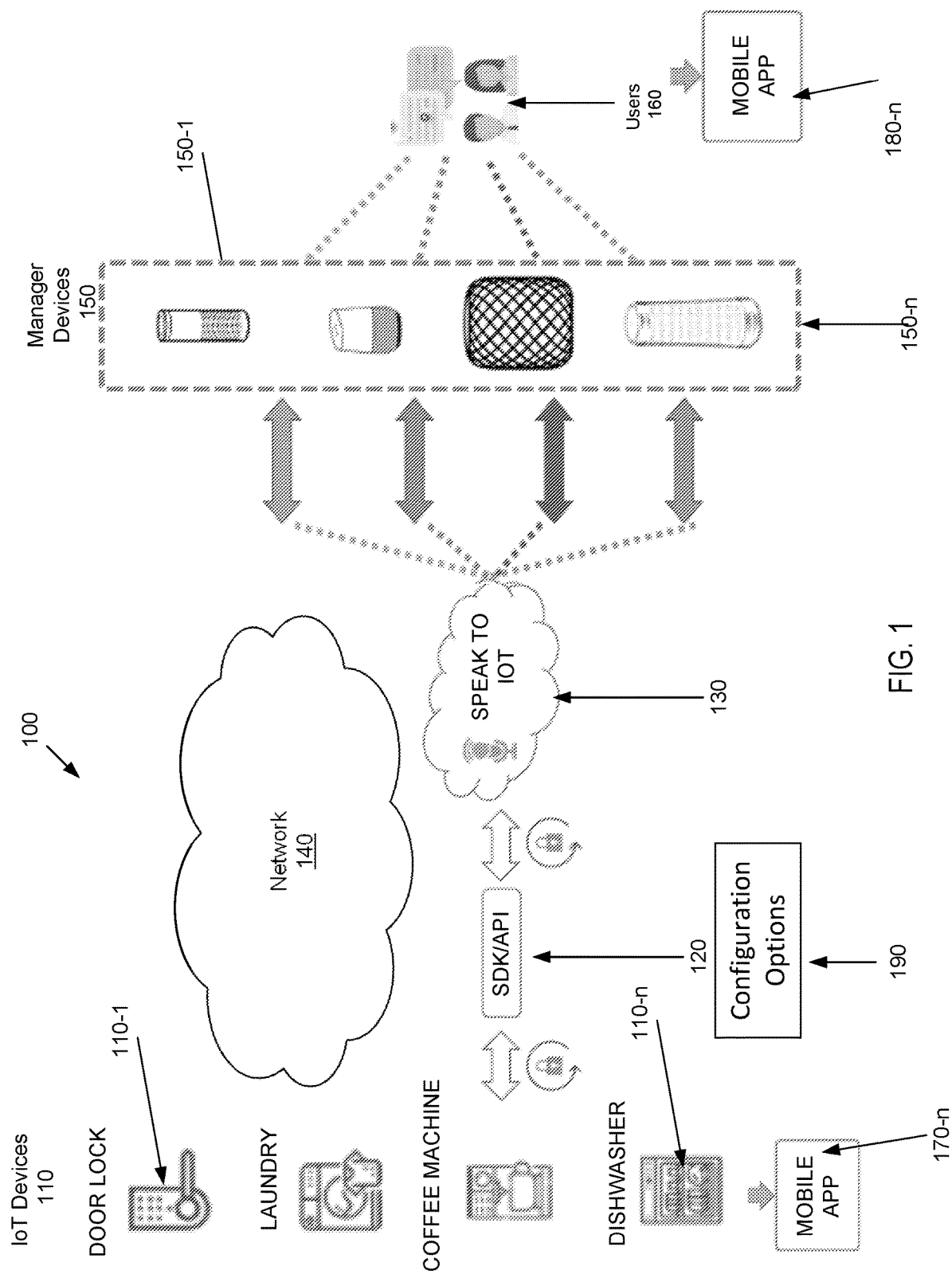
FIG. 1 shows a diagram illustrating an example of a system and method of a seamless connect internet of things devices to intelligent voice assistants.

The systems and methods of seamlessly connecting internet of things devices with different intelligent voice assistants provides a unified and universal connecting capability for all including device manufactures, end-users and intelligent voice assistants. An end-user in a household wants flexibility in purchasing different internet of things ("IoT") devices from different manufacturers that connect with the internet. Speak-to-IoT system allows different IoT devices to be speech enabled with ease irrespective of the brand type of intelligent voice assistants and irrespective of the type of device manufacturer or customer.

Speak-to-IoT cloud system offers a unified and universal connect approach to a varied set of devices irrespective of the internal network settings, applicable intelligent voice assistants used or internet connection. Instead of having a different mobile application or user interface to configure each IoT device, the Speak-to-IoT cloud system offers a single unified mobile application, web interface or user interface to configure all of the IoT devices a user owns. This can be compared to the concept of a universal remote that allowed a user to seamlessly use all the devices connected to your television. Here, the user can seamlessly interact with all of the IoT devices in his household or business place.

The Speak-to-IoT cloud system provides normalized API for all voice providers, managed cloud operations and extremely simple secure device interfaces. It has the following advantages: (i) Lets a device manufacturer write simplified one time code to integrate with all voice service providers; (ii) Provides superfast time to market (iii) Takes away cloud operational headaches while providing smooth maintenance/upgrade/patch capabilities; (iv) Shields manufacturers from voice API or protocol changes; (v) Supports future voice service providers with almost zero effort; (v) Helps keep the device cost low with minimal hardware requirements; (vi) Allows end users to leverage their favorite smart speaker devices; and (vii) It lets end users define and invoke cross-customer workflows. The Speak-to-IoT cloud system provides a perfect combination of AI, IoT and Voice features.

IoT devices have in-built security support in communication on the network within the home and on the internet with the Speak-to-IoT cloud system. Computer security uses authentication and encryption as two mechanisms to secure digital work. Authentication is a method to help verify the identity of the interface that is making or processing requests on the computer. Encryption is a method that allows access to a digital work only when you have a specific key associated with that particular content. A person of ordinary skill in the art would understand that there are different well-established ways of authentication and encryption that can be implemented in the Speak-to-IoT platform to support seamless connect between different IoT devices.

Different embodiments described herein include components or structures to perform the described functionality. A "component" or a "module" as used in this invention disclosure, includes a dedicated or shared processor and, typically, firmware or software modules executed by the processor. Depending upon implementation-specific or other considerations, a module can be centralized or its functionality distributed. A component or a module can include special purpose hardware, firmware, or software embodied in a computer-readable medium for execution by the processor.

In one embodiment, FIG. 1 depicts a diagram 100 illustrating an example of seamlessly connecting IoT devices through the network to a Speak-to-IoT cloud that interacts with a unified approach with intelligent voice assistants. In the example of FIG. 1, the environment includes a first IoT devices 110-1 through an nth client system 110-*n*, network 140, software development kit (SDK) or application programming interface (API) 120 that includes module to configure options 190, a Speak-to-IoT cloud 130, intelligent voice assistant systems 150-1 through an nth 150-*n* systems, and mobile applications 170-1 to 170-n associated with each IoT device and a mobile application 180-1 to 180-n associated with each intelligent voice assistant system 150.

In an implementation, the IoT device 110 includes components related to network connectivity. In one implementation, the IoT device 110 includes speaker and/or microphone hardware and software components to enable receipt and execution of speech commands directly on the device. In another implementation, the IoT device 110 does not include a speaker and/or microphone capability to enable receipt and execution of speech commands directly on the device, yet the IoT device is able to use the Speak-to-IoT cloud system to enable receipt and execution of speech commands translated to device specific SDK/API commands.

In one embodiment, the Device Manufacturers of the IoT devices 110 can provide voice Ecosystem Integration with zero additional programming. The Speak-to-IoT system allows IoT devices 110 to integrate any hardware devices including speakers with Voice Ecosystem 150 providers like Amazon Alexa, Google Home Assistant, Apple HomePod, Microsoft Cortana etc. without writing a single line of code. Speak-to-IoT cloud provides turnkey solution for device manufacturers that accelerates time to market, and offers consumers with voice friendly experience. Device Manufacturers can focus on implementing the core functionality of their smart device—only once—and Speak-to-IoT can take care of voice enablement across all supported voice providers.

In one implementation, the SDK/API 120 includes components to process operation requests for the IoT devices. The SDK/API 120 includes configuring options 190 that is tailored and customized for each specific IoT device based on the customer manufacturing that device. While allowing detailed customizing for savvy users, the SDK/API 120 provides a simplified and uniform version that applies to all the devices. In one implementation, the SDK/API 120 can be customized based on user preferences for a household. For example, the SDK/API 120 may configure night sleep time for all IoT devices to save power and battery energy sources.

The SDK/API 120 uses bilateral communication with Speak-to-IoT cloud system 130. It acts as an interface or bridge between IoT devices 110 and Speak-to-IoT cloud 130. The SDK/API 120 leverages the existing networking communication protocols available on the network 140 to communicate with IoT devices 110 and the Speak-to-IoT cloud 130. In one implementation, the Speak-to-IoT can configure and manage login and passwords on different IoT devices using the configure options 190 in the SDK/API 120. This eliminates the need to open the individual configuration page of each IoT device and allows the Speak-to-IoT cloud to manage with ease. In one implementation, the configuration options 190 include default settings based on time and usage for power savings. The configuration options may also have admin options to allow execution of certain commands only when certain conditions are met. For example, even if the IoT device receives a command to start the laundry, the option is delayed if it is received within nap time in the afternoons or sleep periods for the family at night. Similarly, the dryer for the laundry can be set to be less noisy during resting periods. A person of ordinary skill in the art would understand that the SDK/API 120 including the configuration options capability at 190 provide the default or background parameters and setup the IoT devices to receive and execute live or run-time commands.

The intelligent voice assistants 150-1 to 150-n are from different brands and types. A user(s) 160 may have one or more intelligent voice assistants in his household or business premises. The voice assistants are managing devices 150 that can receive voice commands for an IoT device 110 from the user 160. Each of the voice assistant 150-n may be associated with a corresponding mobile application 180-n. or a web interface or even a user interface. The Speak-to-IoT cloud can provide a unified or universal mobile application that provides a single universal interface for all of the IoT devices and all of the associated intelligent voice assistants for a given user.

Network 140 can be different wireless and wired networks available to connect different computer devices including client and server systems. In an implementation, network 140 is publicly accessible on the internet. In an implementation, network 140 is inside a secure corporate wide area network. In an implementation, network 140 allows connectivity of different systems and devices using a computer-readable medium. In an implementation, the seamless connect Speak-to-IoT cloud computing platform allows users ease of network connection on the IoT devices and the intelligent voice assistants allowing customized applications and operational framework.

The messaging and notification between different components can be implemented using application programming interface (API) calls, extensible markup language ("XML") or Javascript Object Notation ("JSON") config file interfaces between different interfaces, Hypertext Preprocessor (earlier called, Personal Home Page) ("PHP"), Python, Node.js, Java/C++ object-oriented programming or simple web-based tools. Different components may also implement authentication and encryption to keep the data and the requests secure.

Figure 2:
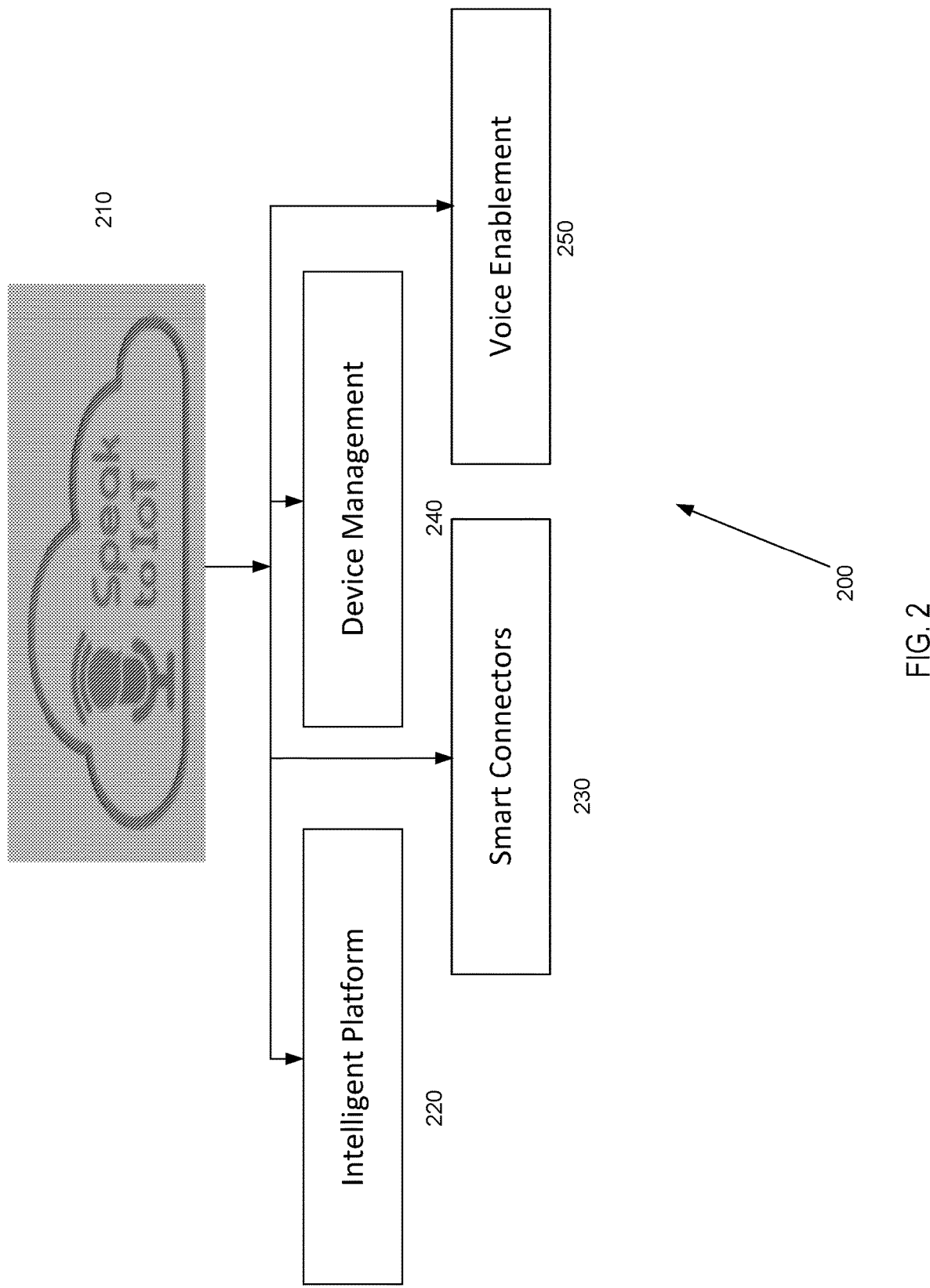
FIG. 2 shows an exploded view of a Speak-to-IoT cloud computing system illustrating different subroutines, according to one embodiment.

FIG. 2 is an exploded view 200 of a Speak-to-IoT 210 cloud system 130 shown in FIG. 1. The Speak-to-IoT cloud 210 has four main components including Intelligent Platform 220, Smart Connectors 230, Device Management 240 and Voice Enablement 250. The Intelligent Platform 220 is artificial intelligence (AI) powered and compatible with other AI-powered ecosystems that may exist at the household or business premise of an end-user. Speak-to-IoT provides an intelligent voice enablement platform for smart devices to help manufacturers leverage Amazon Alexa, Google Assistant, and all other AI-powered ecosystems for their customers while avoiding provider-specific complexities through an intuitive, unified workflow. In one implementation, an IoT device can be voice enabled with a single click. Amazon Alexa, Google Home Assistant, Apple HomePod, Microsoft Cortana, and many other companies (collectively referred to as Voice Service Providers) are providing intelligent voice AI (artificial intelligence) platforms through smart speakers that can be manager modules that can be managed uniformly using the Speak-to-IoT cloud system for a variety of internet-connected smart IoT (Internet of Things) devices.

Figure 3:
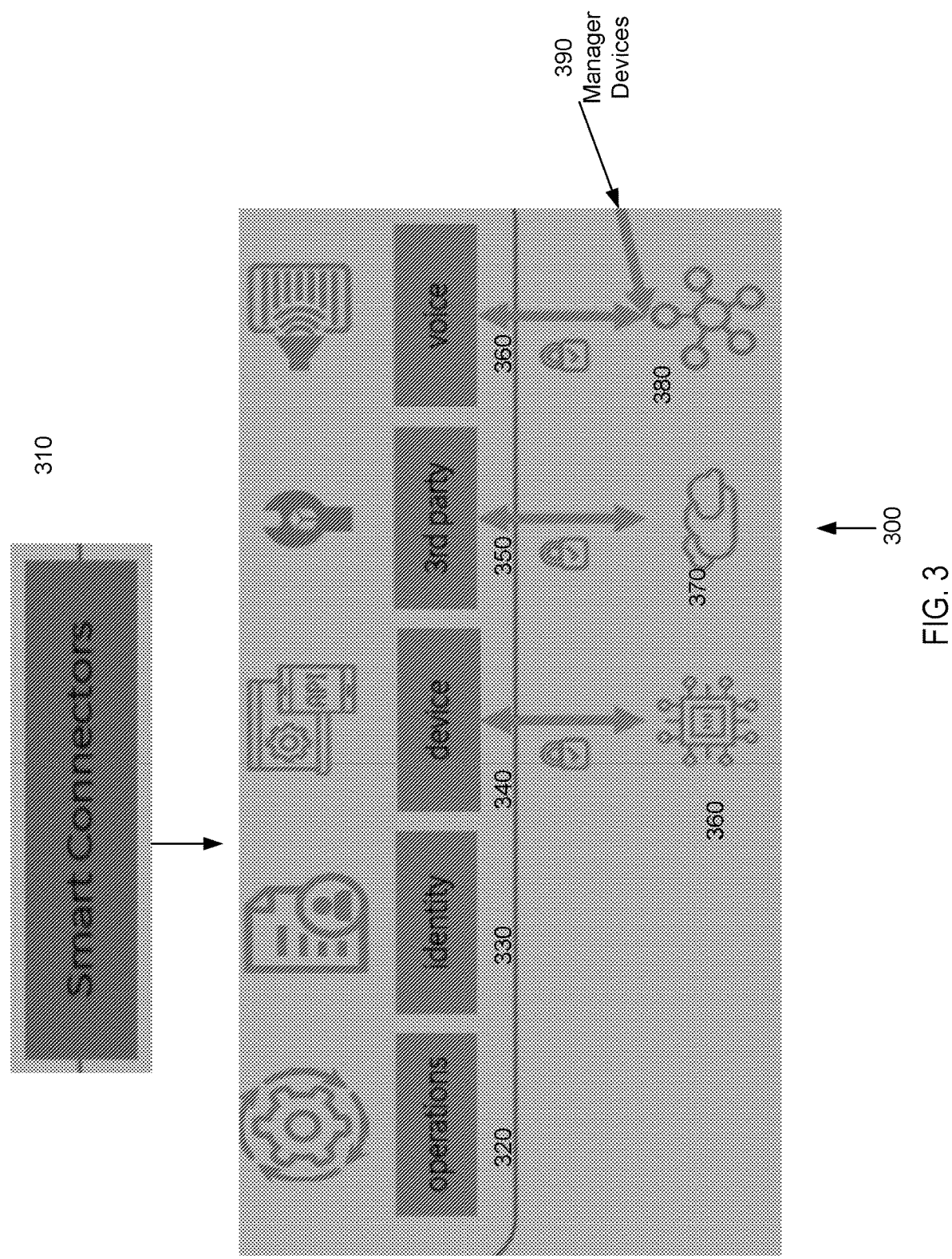
FIG. 3 is an exploded view of a smart connectors module from a Speak-to-IoT cloud computing system illustrating different modules and functions, according to one embodiment.

The Smart Connectors 230 are described in detail in FIG. 3. Device Management 240 works with SDK/API 120 to allow different device configurations and settings. Speak-to-IoT includes a customer or device manufacturer specific container that includes different customer device types and associated device configuration settings. Voice Enablement 250 works with smart intelligent voice assistants to receive and execute voice commands. For example, even in situations when a device does not have speaker/microphone directly connected to itself, a user can give a voice command to the voice assistant that is translated to a command using the SDK/API 120 to be executed on the device itself.

In another embodiment, the Speak-to-IoT cloud system provides smart network gateway application for both home and business enterprise. In one embodiment, the Intelligent Platform 220 implements an intelligent protocol that enables consumers with Plug-n-Play to setup smart home without any complications irrespective of the device brand and type. The Intelligent Platform allows natural language-based setup to use IoT devices to their full potential with robust security practices. For example, the Intelligent Platform may grant permission for guest to access Wi-Fi services without sharing the household password known to family members. Another example, the Intelligent Platform may allow automatic setting up of the microwave oven based on a recipe scanned from a box. The user no longer has to read the Microwave oven directions to cook or heat up the food. The Microwave oven with a camera can scan the box and set up itself automatically.

In one embodiment, the Speak-to-IoT cloud system is used in an end-consumer home. In another embodiment, the Speak-to-IoT cloud system is used by a business or enterprise. In one embodiment, the Intelligent Platform works with Customer Support and Helpdesk to provide decentralized automated help. Intelligent voice guidance from devices like speaker to offer consumers with self-diagnosis and automatic registration of complain tickets. The Intelligent Platform would allow ease of remote diagnosis, intelligent reporting and scheduling of site visit for maintenance, contract renewal, etc. The automated support from the Intelligent Platform allows new process cuts for customer support cost and improves consumer experience.

In one embodiment, the Speak-to-IoT cloud system provides smart security intrusion detection and custom notification to end-users. Speak-to-IoT cloud system can provide network infiltration warnings and automatically shutting down vulnerable entities with customer's network. It can also provide content filtering, parental control notifications, etc. It allows for custom integration with other services. For example, Family Member left/arrived via Uber can be automatically welcomed with open door or locking of door after leaving. Another example uses app integration for UPS driver at your door using camera integration to allow for placing of packages at a secure location within your garage.

In one embodiment, Speak-to-IoT assists with Emergency announcements for an end-user and/or business enterprise. For example, Speak-to-IoT may send proactive notifications from the speaker saying active shooter on school campus in your neighborhood received from School Safety or Police Department. In one embodiment, the Speak-to-IoT system is used for location-based information systems including public sector utility services with water, energy downtimes and connections. In one embodiment, the Speak-to-IoT cloud system leverages the voice capabilities for laptops, desktops etc. An end-user can take some action on your local system based on voice (as 3rd party app)—irrespective of Cortana, Siri, etc.—open a Word document, edit a PPT file and reorder slides, etc. A user can also have speech commands for replacement of OS commands from moving files, creating directory, sorting pictures, searching files, etc.

FIG. 3 is an exploded view of modules in Smart Connectors 310 in a Speak-to-IoT cloud system. The different components or modules included in smart connectors include operations 320, identity 330, device 340, third-party module 350 and voice module 360. The operations 320 allows for Speak-to-IoT cloud system wide as well as individual device level operations. For example, if a household is going on vacation, a system wide operation would include shutting down all of the devices. A user could configure all of the devices to wake up few hours before arrival back home. The heating or air conditioning system would be turned on to welcome the user and his family members back to a warm or cool home depending on the season and outside weather. The identity 330 ensures that only authorized users are allowed to access devices that belong to them. For example, authentication can be based on traditional methods of username and password or voice authentications based on voiceprints.

The identity 330 defines different access levels for different devices execution commands as well as configuration commands. For example, an admin user will have the authority to set different levels of access for different users. There could be a guest profile for visitors to a household. There could be a child versus an adult profile that puts in appropriate safety and security measures including parental controls. Role-based access based on voice authentication includes policy mechanisms to allow or deny speech access to a set of IoT devices based on invoking user's privileges i.e. unauthorized user, normal user, supervisor etc.

In one embodiment, role-based access also includes allowing or denying certain commands on a single IoT device based on the privileges of invoking user. These access privileges can be provided and verified over voice using a number of mechanisms, including voice-prints, special purpose access codes, one time passwords (OTPs), PIN or other security codes, etc. In one embodiment, role-based voice authentication is applied in a retail store to respond to different help questions. An end-user would have access to different help responses whereas voice authentication of an employee of the retail store allows the employee access to internal database storage including data on inventory, deals, pricing etc.

The device module 330 helps smart connections with a variety of different types of devices. Each device has its unique set of software and hardware interface features and the smart connectors adjusts itself and provides a unified approach to connecting with ease to a variety of different devices. For example, it does not matter for the Speak-to-IoT system whether it is connecting to an LG bulb or a GE bulb. Each device specific hardware 360 is connected to the smart connector module 310. The smart connector 310 solves the mystery and makes it transparent to the user. The third-party module 350 helps connect with device or customer specific applications 370 in the cloud. To the extent there is device specific information or reporting, the third-party module can import that information from the third-party module 350 by connecting to the external cloud system 370 and show it seamlessly to the Speak-to-IoT cloud user. An end user does not have to login and process information from different third-party customer specific cloud systems. For example, if a household has 25 different customer devices, the user does not have to go to 25 different device specific cloud systems and can get all of the data from 25 different sources directly through the Speak-to-IoT cloud system. Similarly the voice module 360 assists with connecting to the intelligent voice assistants 380 that in turn connect to the external manager modules 390. For example, Amazon's Alexa or Google Home Assistant smart speakers/microphone systems would be the external manager modules 390. For the Speak-to-IoT system compatibility and ease of use is essential to providing seamless services across a variety of different IoT devices. A manager module 390 may reside in an intelligent voice assistant system, an IoT hub or another IoT device.

Figure 4:
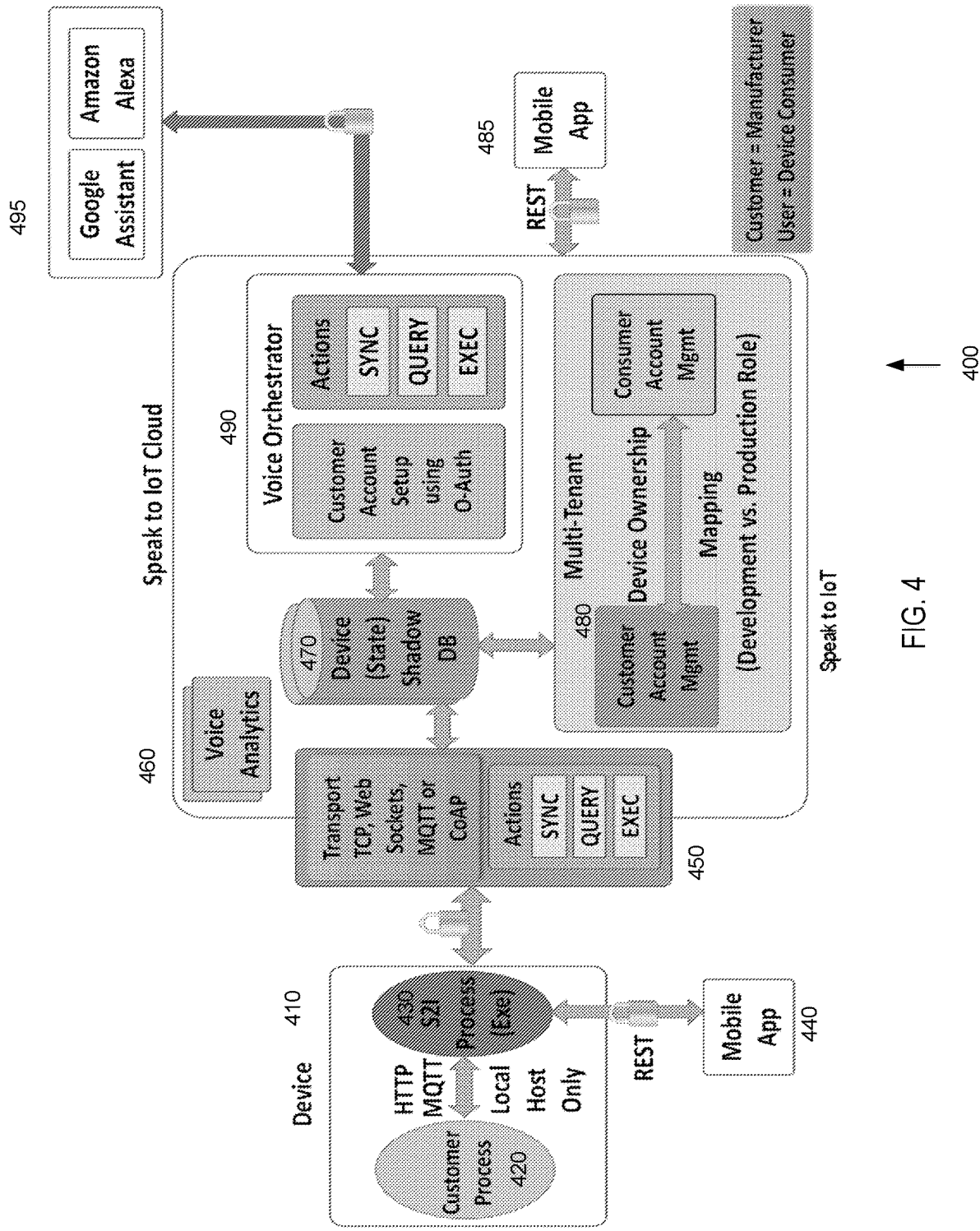
FIG. 4 is an exploded view of a Speak-to-IoT cloud computing architecture interacting with internet of things device and intelligent voice assistants illustrating different modules and functions, according to one embodiment.

FIG. 4 is an exploded view of a Speak-to-IoT system 130 of FIG. 1. The different components or modules included in a Speak-to-IoT system includes mobile app 440 that is connected to a device 410. The device 410 includes a customer process 420 that communicates using Hyper-Text Transport Protocol ("HTTP"), Hyper-Text Transport Protocol Secure ("HTTPS") or Message Queuing Telemetry Transport ("MQTT") protocol to its local host using Speak-to-IoT Process 430. The device communication through the Speak-to-IoT process is encrypted to connect to the internet or network using 450 Transport commands that include Transport control protocol ("TCP"), Web Sockets, MQTT or Constrained Application Protocol ("CoAP"). The types of communications include Actions of Sync, Query and Execute commands. The messages from the devices are sent to device state shadow database ("DB") 470. The database triggers voice orchestrator 490 or customer specific container 480 depending on the type of message. The voice orchestrator 490 includes customer account setup using O-Auth. The same types of communications include Actions of Sync, Query and Execute commands. The Multi-Tenant 480 includes customer account management, device ownership and corresponding mapping to an end-user or consumer account management. The mapping results in a normalizing effect of receiving different types of commands that are translated uniformly across different types of IoT devices interacting with a variety of intelligent voice assistant systems.

Speak-to-IoT includes logging or backend report of voice analytics flowing through the system at 460. The voice orchestrator 490 communicates with intelligent voice assistants 495 for example, google assistant or Amazon Alexa. Mobile App 485 is associated with a mobile app to configure the intelligent voice assistant. Speak-to-IoT cloud system can provide a single mobile App to control multiple devices and multiple smart voice assistants.

Figure 5:
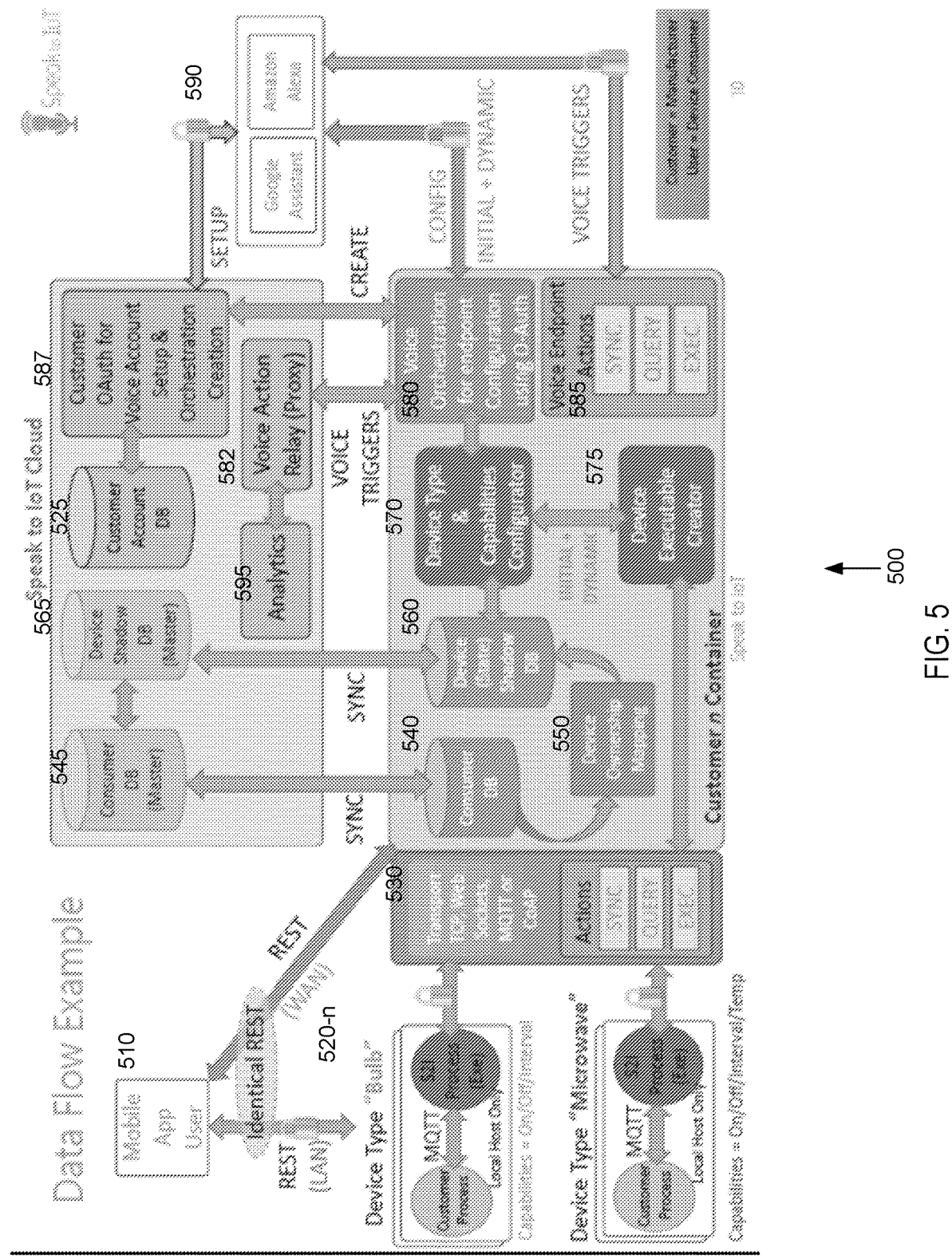
FIG. 5 shows the data flow between different modules in a Speak-to-IoT cloud computing architecture, according to one embodiment.

FIG. 5 shows the flow of data using different communication and networking protocols through the Speak-to-IoT cloud system. The mobile app user 510 can communicate using local area network inside a home or building to device type 520-1 to 520-n. For example, device type 502-1 is a bulb and device type 502-2 is a microwave. As discussed in FIG. 4, the device includes a customer process and a Speak-to-IoT process that communicates using MQTT. Each device communicates with the Speak-to-IoT cloud at 530 using different types of Transport protocols described earlier in context of FIG. 4. The Mobile App user can directly communicate using wide area network to the Speak-to-IoT cloud. The Speak-to-IoT cloud includes a consumer database 540, a device state shadow database 560 and the two databases communicate data changes and triggers using device ownership mapping 550. A particular device type and capabilities are tracked by Device Type and Capabilities Configurator 570 that communicates with Device Executable Creator 575. The information bilaterally flows back to the devices using the Transport protocol 530. The voice orchestration for endpoint configuration using O-Auth 580 includes voice endpoint actions 585. The intelligent voice assistants 590 with Google Assistant or Amazon Alexa can configurate, initialize and dynamically control the voice orchestration 580. An end-user can use voice triggers for voice endpoint actions 585. The Speak-to-IoT cloud includes a backend or backup system that mirrors the finalized consumer database transactions at 545, device shadow database master at 565, customer account database 525. The voice orchestration 587 only allows actions after authentication and also allows for voice analytics 595 or voice action relay (proxy) 582 configurations. The initial creation and initialization steps are streamlined and make it easy for the user to add or remove a device.

Figure 6:
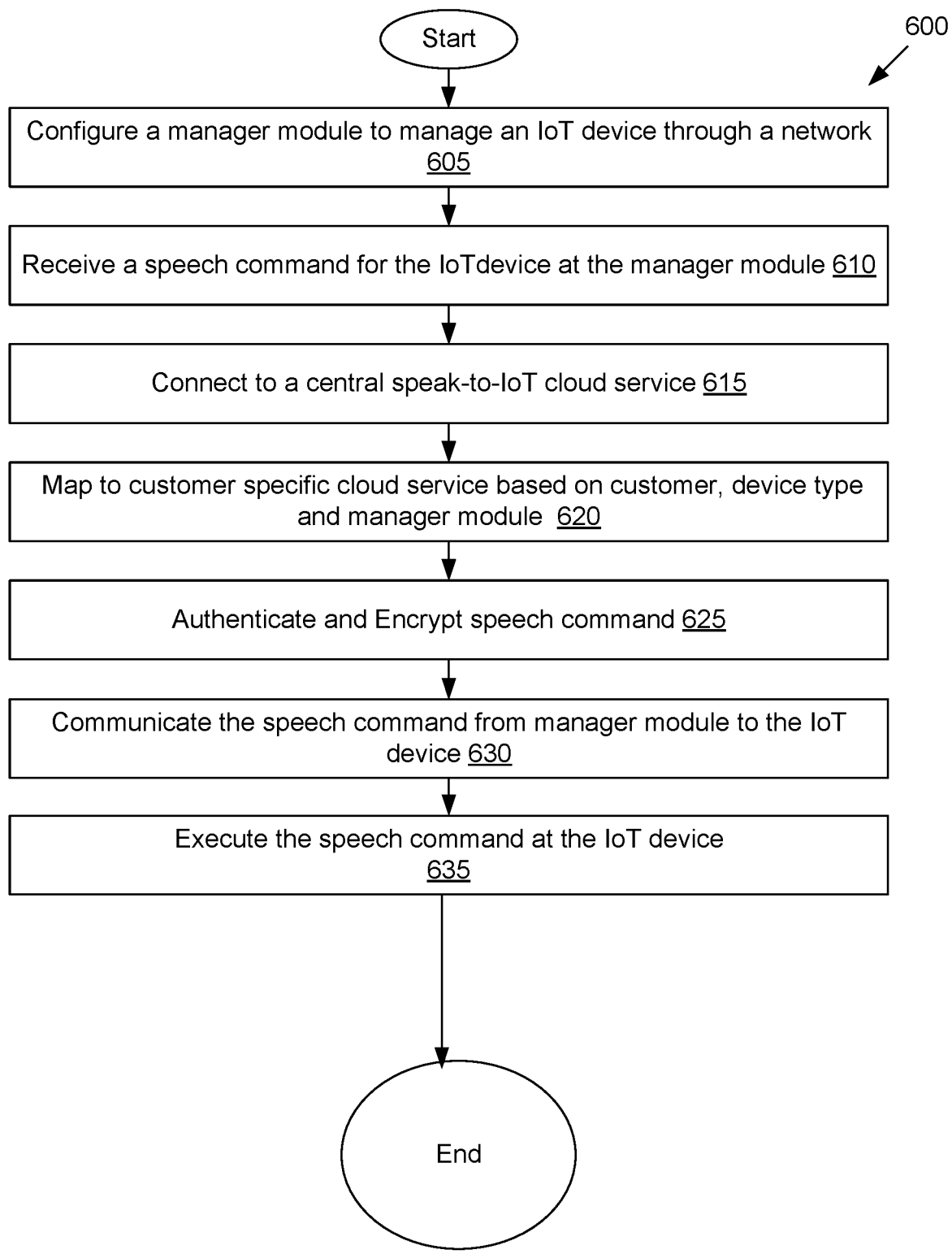
FIG. 6 shows a flowchart illustrating an example of a method of a Speak-to-IoT cloud computing platform for seamlessly connecting internet of things device to intelligent voice assistant.

FIG. 6 depicts a flowchart 600 illustrating an example of a method for a seamless connect of an internet of things (IoT) device with intelligent voice assistant for voice enablement. The flowchart 600 is discussed in conjunction with the environment shown in the diagram 100 in FIG. 1. At block 605, begins with configuring a manager module to manage an IoT device through a network 140. At block 610, after a user sends and the manager module receives a speech command for the IoT device at the manager module. At block 615, the IoT and the manager module connect to a central Speak-to-IoT cloud service. At block 620, the speak-to-cloud system maps the customer specific cloud service based on the customer type and manager module type. At block 625, the speech command is authenticated and encrypted. At block 630, the Speak-to-IoT translates and communicates the speech command from the manager module to the IoT device. At block 635, the IoT device receives and executes the speech command and the IoT device.

In broad embodiment, the invention is systems and methods of a seamless connect of internet of things to any intelligent voice assistants to allow voice enablement and a single unified experience with a universal mobile application to control internet of things devices and interact with intelligent voice assistants.

Figure 7:
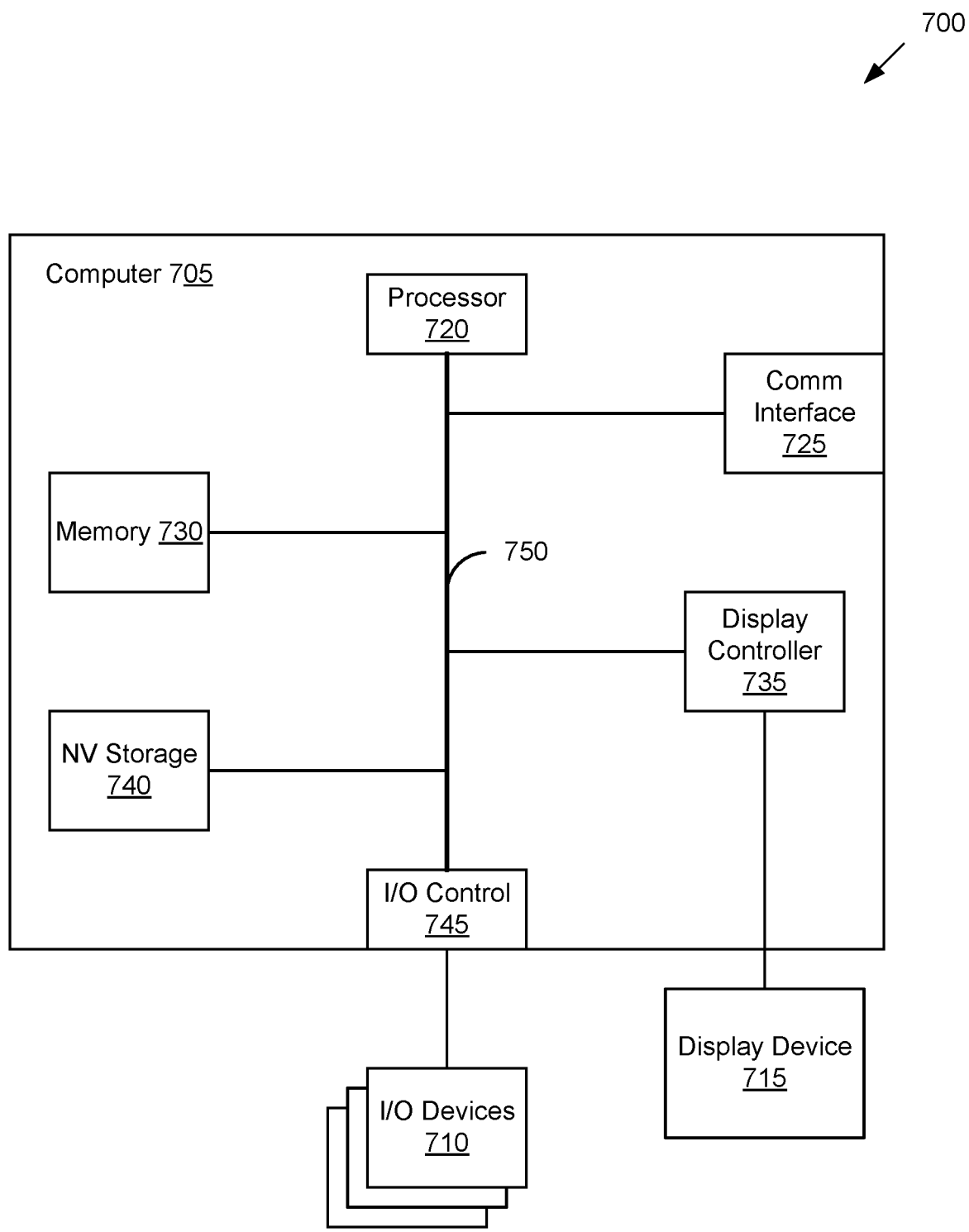
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, IoT device 110, SDK/API 120, Speak-to-IoT system 130, voice assistants 150, user end devices with mobile apps 170 or 180 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Figure 8:
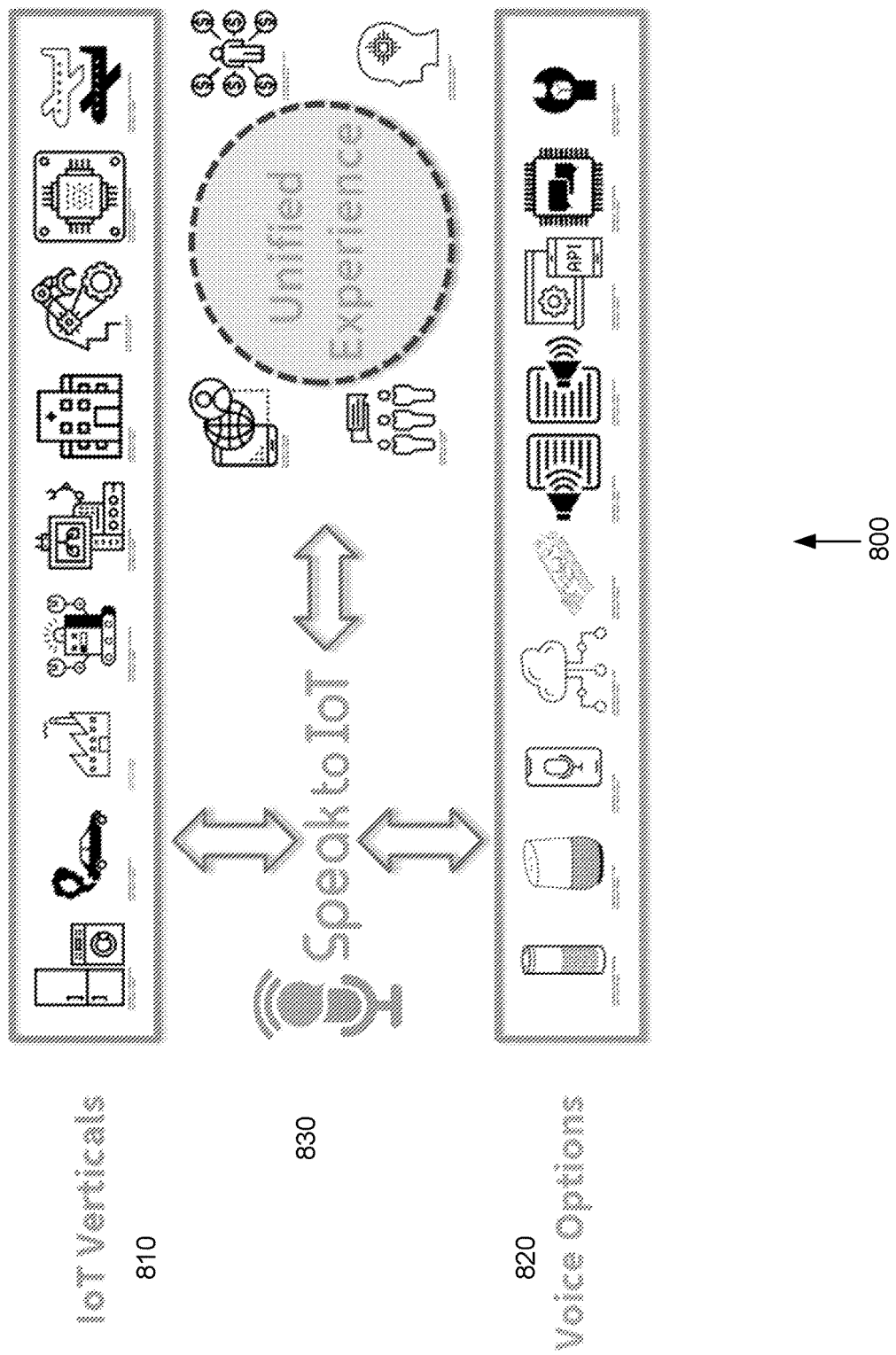
FIG. 8 is a block level diagram illustrating different types of IoT applications that can be uniformly connected to a variety of intelligent voice assistants and an exemplary, universal mobile application that provides a unified user interface.

FIG. 8 shows different vertical applications. Although a majority of such applications are centered around smart home and home automation space, the concept of using voice as a primary input/output channel to control any device is not limited to smart home vertical. 810 shows different IoT verticals including household appliances, automation, industrial factory productions, public utility operations including electricity generation, garbage disposals, hospitals, construction, integrated circuits and fabrication, and/or aviation industries. The voice options 820 can be provided using Amazon Alex, Google Home, Apple Siri, Microsoft Cortana, native applications on the cloud, IoT hub speech applications etc. The Speak-to-IoT 830 provides a unified experience between different IoT verticals 810 and Voice Options 820.

Figure 9:
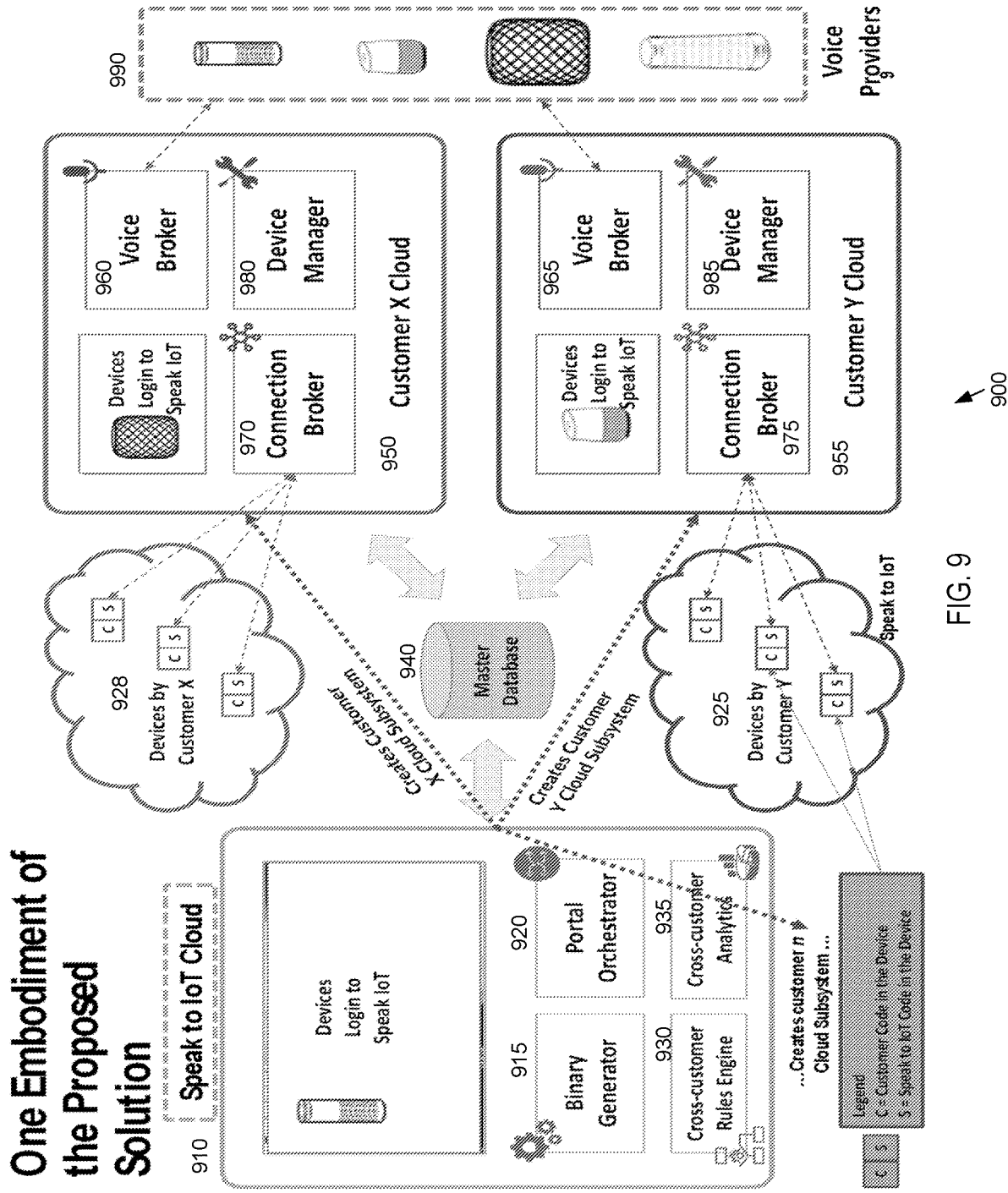
FIG. 9 is an exploded view of a Speak-to-IoT cloud computing architecture according to one embodiment.

FIG. 9 shows one embodiment of the proposed solution. Speak-to-IoT cloud 910 includes binary generator 915 that can be executed on different devices, portal orchestrator 920, cross-customer rule engine 930 and cross-customer analytics 935. At the time of initialization or when a device is added to the system, a customer X cloud subsystem X is created for a given customer device. Depending on the device type, one or more of the devices of Customer X 928 are selected for creation. The 950 Customer X Cloud includes Connection Broker 970, Device Manager 980 and Voice Broker 960. Similarly, for device by Customer Y 925, one or more of device types from Customer Y are selected to be included in the 955 Customer Y Cloud with Connection Broker 975, Device Manager 985 and Voice Broker 965. The Voice Providers 990 can speak with both Customer X and Customer Y Clouds. While Customer X and Customer Y clouds are stored and separated internal to the Speak-to-IoT cloud system, the experience for the end-user is seamless and uniform with respect to adding a device for any given customer.

In one embodiment, the Speak-to-IoT cloud system is implemented using a blockchain platform. The blockchain platform provides different services that are modular, customized and flexible for a given set of users. For example, the blockchain platform provides modular services for text to speech, digital signal processing, translation services etc. Speak-to-IoT cloud can pick and choose to modularly work with a blockchain platform to provide additional features and services to its customers and the end-users.

Figure 10:
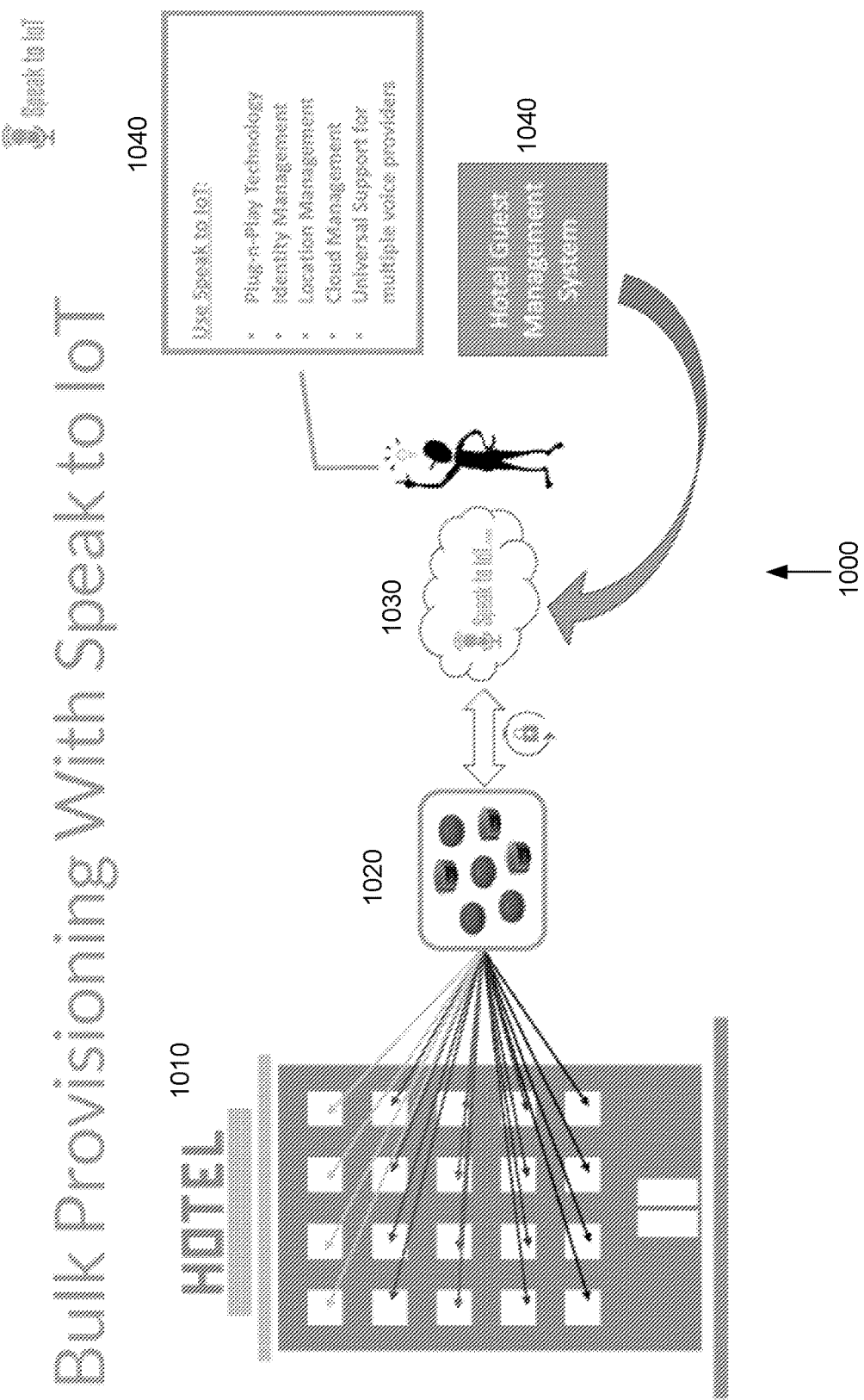
FIG. 10 is an exploded view of bulk provisioning with Speak-to-IoT cloud system showing data flow for example, in a hotel.

FIG. 10 shows a voice activated device bulk provisioning example using the Speak-to-IoT cloud. Speak-to-IoT cloud allows simplified, secured and Plug-n-Play deployment of Voice Activated devices at a single site or an enterprise with multiple branch sites. For example, a hotel offering guest services, in-room management, etc. using Voice Activated speakers. The hotel guest management system 1040 includes different features: plug-n-play technology, identity management, location management, cloud management, universal support for multiple voice providers. The hotel management system 1040 interacts with Speak-to-IoT cloud system 1030 that connects directly with different IoT devices 1020 placed in different rooms of the hotel 1010.

Figure 11:
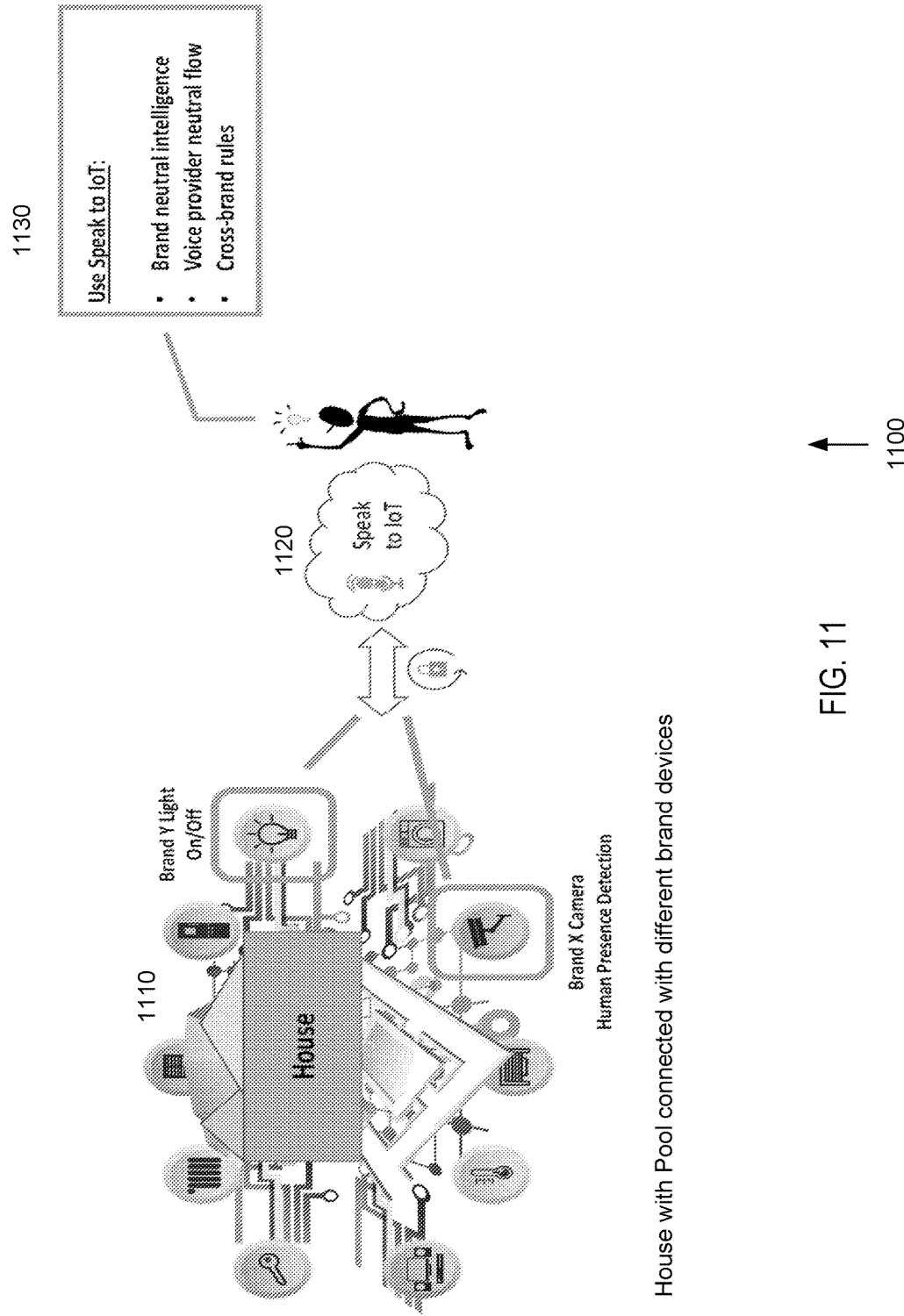
FIG. 11 is an exploded view of cross-brand automation with Speak-to-IoT cloud, according to one embodiment.

FIG. 11 shows a cross-band automation with Speak-to-IoT cloud system. The Speak-to-IoT 1120 allows for cross customer work flow automation for both household and business enterprise 1110. Speak-to-IoT cloud system allows 1130 features: brand neutral intelligence, voice provider neutral flow and cross-brand rules. The Speak-to-IoT cloud can coordinate among devices from different customers and implement a voice-driven workflow across customers. For example, a Home camera from customer X detects nobody is at home, tell customer Y's smart lights to turn off.

Several components described here, including clients, servers, and engines, can be compatible with or implemented using a cloud-based computing system. As used here, a cloud-based computing system is a system that provides computing resources, software, and/or information to client systems by maintaining centralized services and resources that the client systems can access over a communications interface, such as a network. The cloud-based computing system can involve a subscription for services or use a utility pricing model. Users can access the protocols of the cloud-based computing system through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of seamlessly connecting an internet of things ("IoT") device to one or more intelligent voice assistants, comprising:
   configuring a manager module to manage two or more IoT devices of different brands connected to a network;
   receiving a specification file from a customer based on customer preference;
   generating a runtime Speak-to-IoT cloud module and an IoT device module that translate manager module voice command syntax to customer command syntax;
   receiving a speech command for one of the IoT devices at the manager module through a mobile application, a smart speaker, a web interface or any other user interface;
   receiving a second speech command for a second IoT device of a different brand at the manager module through a mobile application, a smart speaker, a web interface or any other user interface;
   connecting to a central Speak-to-IoT cloud service;
   translating the speech commands from different brands of the IoT devices to invoke the speech commands based on detected parameters for cross-brand automation;
   dynamically receiving a map to connect to a customer specific Speak-to-IoT cloud service based on the customer, IoT device types and the manager module;
   securely authenticating an end user with the customer specific Speak-to-IoT cloud service;
   communicating and executing the speech commands on the IoT devices.

2. The method of claim 1, further comprising:
   converting the IoT devices to voice enabled IoT devices at runtime.

3. The method of claim 1, further comprising:
   authenticating the manager module and the IoT devices, and encrypting the speech commands.

4. The method of claim 1, further comprising:
adding or replacing one of the IoT devices with another IoT device of the same device type from another customer for seamless connectivity.

5. The method of claim 1, further comprising:
adding or replacing the manager module with a manager module of another type for seamless connectivity.

6. The method of claim 1, further comprising:
authenticating using a speech command to provide a touchless experience;
allowing role-based access to invoke additional speech commands.

7. The method of claim 1, further comprising:
consolidating two or more speech commands for communicating and executing in a sequence or group using a single speech command.

8. The method of claim 1, further comprising:
using a blockchain platform for the Speak-to-IoT cloud or customer specific Speak-to-IoT cloud.

9. A system of seamlessly connecting an internet of things ("IoT") device to one or more intelligent voice assistants, comprising:
a module to configure a manager module to manage two or more IoT devices of different brands connected to a network;
a module to receive a specification file from a customer based on customer preference;
a module to generate a runtime Speak-to-IoT cloud module and an IoT device module that translate manager module voice command syntax to customer command syntax;
a module to receive a speech command for one of the IoT devices at the manager module through a mobile application, a smart speaker, a web interface or any other user interface;
a module to receive a second speech command for a second IoT device of a different brand at the manager module through a mobile application, a smart speaker, a web interface or any other user interface;
a module to connect to a central Speak-to-IoT cloud service;
a module to translate the speech commands from different brands of the IoT devices to invoke the speech commands based on detected parameters for cross-brand automation;
a module to dynamically receive a map to connect to a customer specific Speak-to-IoT cloud service based on the customer, IoT device type and the manager module;
a module to securely authenticate an end user with the customer specific Speak-to-IoT cloud service;
a module to communicate and execute the speech command on the IoT device.

10. The system of claim 9, further comprising:
a module to convert the IoT devices to a voice enabled IoT devices at runtime.

11. The system of claim 9, further comprising:
a module to authenticate the manager module and the IoT devices, and encrypting the speech commands.

12. The system of claim 9, further comprising:
a module to add or replace one of the IoT devices with another IoT device of the same device type from another customer for seamless connectivity.

13. The system of claim 9, further comprising:
a module to add or replace the manager module with a manager module of another type for seamless connectivity.

14. The system of claim 9, further comprising:
a module to authenticate using a speech command to provide a touchless experience;
a module to allow role-based access to invoke additional speech commands.

15. The system of claim 9, further comprising:
a module to consolidate two or more speech commands for communicating and executing in a sequence or a group using a single speech command.

16. The system of claim 9, further comprising:
a module to use a blockchain platform for the Speak-to-IoT cloud or customer specific Speak-to-IoT cloud.

* * * * *